United States Patent
Lee et al.

(10) Patent No.: US 9,755,299 B2
(45) Date of Patent: Sep. 5, 2017

(54) WINDOW ASSEMBLY HAVING A TRANSPARENT LAYER AND AN OUTER REGION FOR AN ANTENNA ELEMENT

(75) Inventors: Ming Lee, Ypsilanti, MI (US); Wladimiro Villarroel, Lewis Center, OH (US); Yasutaka Horiki, Ypsilanti, MI (US); Kwan-ho Lee, Mountain View, CA (US)

(73) Assignees: AGC AUTOMOTIVE AMERICAS R&D, INC., Ypsilanti, MI (US); AGC FLAT GLASS NORTH AMERICA, INC., Alpharetta, GA (US)

( * ) Notice: Subject to any disclaimer, the term of this patent is extended or adjusted under 35 U.S.C. 154(b) by 455 days.

(21) Appl. No.: 13/992,611

(22) PCT Filed: Dec. 9, 2011

(86) PCT No.: PCT/US2011/064164
§ 371 (c)(1),
(2), (4) Date: Sep. 17, 2013

(87) PCT Pub. No.: WO2012/078986
PCT Pub. Date: Jun. 14, 2012

(65) Prior Publication Data
US 2014/0104122 A1    Apr. 17, 2014

Related U.S. Application Data

(60) Provisional application No. 61/421,374, filed on Dec. 9, 2010, provisional application No. 61/421,386, filed
(Continued)

(51) Int. Cl.
| | | |
|---|---|---|
| *H01Q 1/32* | (2006.01) | |
| *H01Q 1/12* | (2006.01) | |
| *H01Q 9/42* | (2006.01) | |

(52) U.S. Cl.
CPC .......... *H01Q 1/325* (2013.01); *H01Q 1/1271* (2013.01); *H01Q 9/42* (2013.01)

(58) Field of Classification Search
CPC .......... H01Q 1/325; H01Q 13/10; H01Q 9/40; H01Q 1/1271; H01Q 9/42
(Continued)

(56) References Cited

U.S. PATENT DOCUMENTS

| | | |
|---|---|---|
| 3,655,545 A | 4/1972 | Gillery et al. |
| 4,791,426 A | 12/1988 | Lindenmeier et al. |

(Continued)

FOREIGN PATENT DOCUMENTS

| | | |
|---|---|---|
| CN | 1402379 A | 3/2003 |
| CN | 101091286 A | 12/2007 |

(Continued)

OTHER PUBLICATIONS

English language abstract and machine-assisted English translation for CN 101895008 extracted from espacenet.com database on Dec. 29, 2014, 18 pages.
(Continued)

*Primary Examiner* — Jessica Han
*Assistant Examiner* — Noel Maldonado
(74) *Attorney, Agent, or Firm* — Howard & Howard Attorney PLLC

(57) ABSTRACT

A window assembly for a vehicle has a transparent layer including a metal compound such that the transparent layer as is electrically conductive. The transparent layer defines an area covering the window assembly. An outer region which is electrically non-conductive surrounds the area. The window assembly includes an antenna element including wire or transparent coating disposed within and surrounded by the outer region without extending into the transparent layer. The antenna element is electrically disconnected from the
(Continued)

transparent layer such that the antenna element operates independent of the transparent layer. A feeding element is coupled to the antenna element for energizing the antenna element. The feeding element is electrically disconnected from the transparent layer such that the feeding element energizes the antenna element independent of the transparent layer.

20 Claims, 9 Drawing Sheets

Related U.S. Application Data on Dec. 9, 2010, provisional application No. 61/421,376, filed on Dec. 9, 2010, provisional application No. 61/421,381, filed on Dec. 9, 2010, provisional application No. 61/427,450, filed on Dec. 27, 2010.

(58) Field of Classification Search
USPC .......................................................... 843/713
See application file for complete search history.

(56) References Cited

U.S. PATENT DOCUMENTS

| | | | |
|---|---|---|---|
| 4,849,766 A | 7/1989 | Inaba et al. | |
| 4,864,316 A * | 9/1989 | Kaoru et al. | 343/704 |
| 5,005,020 A | 4/1991 | Ogawa et al. | |
| 5,017,933 A | 5/1991 | Sakurai et al. | |
| 5,132,161 A | 7/1992 | Shibata et al. | |
| 5,355,144 A * | 10/1994 | Walton et al. | 343/713 |
| 5,528,314 A | 6/1996 | Nagy et al. | |
| 5,589,839 A | 12/1996 | Lindenmeier et al. | |
| 5,670,966 A | 9/1997 | Dishart et al. | |
| 5,739,794 A | 4/1998 | Nagy et al. | |
| 5,898,407 A * | 4/1999 | Paulus | B32B 17/10 |
| | | | 343/713 |
| 5,926,141 A | 7/1999 | Lindenmeier et al. | |
| 6,020,855 A * | 2/2000 | Nagy et al. | 343/713 |
| 6,400,334 B1 | 6/2002 | Lindenmeier et al. | |
| 6,448,935 B2 | 9/2002 | Fuchs et al. | |
| 6,670,927 B2 | 12/2003 | Ro | |
| 7,119,751 B2 * | 10/2006 | Li et al. | 343/713 |
| 7,388,548 B2 | 6/2008 | Maeuser | |
| 7,456,796 B2 | 11/2008 | Nagayama et al. | |
| 7,764,239 B2 | 7/2010 | Baranski | |
| 2005/0212709 A1 | 9/2005 | Doi et al. | |
| 2010/0220019 A1 | 9/2010 | Boote | |

FOREIGN PATENT DOCUMENTS

| | | |
|---|---|---|
| CN | 101895008 A | 11/2010 |
| EP | 0297813 A2 | 1/1989 |
| EP | 0 561 272 A1 | 9/1993 |
| EP | 0 720249 B1 | 7/1998 |
| EP | 0760537 B1 | 5/2000 |
| EP | 0961342 B1 | 11/2005 |
| JP | 2003-017919 A | 1/2003 |

OTHER PUBLICATIONS

English language abstract and machine-assisted English translation for JP 2003-017919 extracted from the PAJ database on Dec. 29, 2014, 23 pages.
International Search Report for Application No. PCT/US2011/064239 dated Mar. 6, 2012, 7 pages.
English language abstract not found for CN 1402379; however, see English language equivalent U.S. Pat. No. 6,670,927. Original document extracted from espacenet.com database on Sep. 8, 2014, 6 pages.
English language abstract for CN 101091286 extracted from espacenet.com database on Sep. 17, 2014, 2 pages.

* cited by examiner

WINDOW ASSEMBLY HAVING A TRANSPARENT LAYER AND AN OUTER REGION FOR AN ANTENNA ELEMENT

RELATED APPLICATIONS

This application is the National Stage of International Patent Application No. PCT/US2011/064164, filed on Dec. 9, 2011, which claims priority to U.S. Provisional Patent Application Nos. 61/421,374, 61/421,386, 61/421,376, and 61/421,381 each filed on Dec. 9, 2010, and U.S. Provisional Patent Application No. 61/427,450 filed on Dec. 27, 2010, each of which is hereby incorporated by reference.

BACKGROUND OF THE INVENTION

1. Field of the Invention

The subject invention generally relates to a window assembly for a vehicle. More specifically, the subject invention relates to a window assembly having a transparent layer with an antenna element disposed within and surrounded by an outer region of the window assembly.

2. Description of the Related Art

Recently, there is an increasing demand in vehicle windshields having clear films or coatings embedded within the windshield for various purposes. Such clear films or coatings often have metal compounds, such as metal oxides, for making the clear films or coatings electrically conductive. These clear films or coatings have been utilized in defogging or defrosting systems and even as active antenna elements for vehicles. More recently, the clear films or coatings have been applied to windshields to absorb heat from sunlight penetrating the windshield. In particular, the clear films or coatings absorb infrared radiation from sunlight. In so doing, the clear films or coatings reduce the amount of infrared radiation entering an interior of the vehicle. The clear films or coatings enable a lower interior temperature as compared to a vehicle having a windshield with no clear films or coatings. As a result, during the warm months, less energy is required to lower the interior temperature of the vehicle. To maximize efficiency of the clear films or coatings to absorb infrared radiation, the clear films or coatings are often applied over a substantial part of the windshield, often covering the entire field of view of the driver.

Traditionally, antennas have been employed on vehicle windshields for a variety of applications. The antennas are often placed upon various locations of the windshield and are energized by a feeder line which is coupled to the antenna. Frequently, it is necessary for the antennas to be disposed within or on an outer surface of the windshield of the vehicle. For the antenna to effectively receive or transmit radio waves without interruption, it is also necessary to reduce surrounding electromagnetic interference with the antenna to the extent possible.

Although the clear films or coatings effectively reduce transmission of infrared radiation through the windshield, the clear films or coatings may also negatively impact the ability of the antenna to adequately transmit or receive radio waves. Specifically, as mentioned above, the clear films or coatings are electrically conductive and therefore naturally have the potential to interfere adversely with the radiation pattern and gain of the antenna on the windshield. Furthermore, where the clear films or coatings are applied over a substantial part of the windshield, there remains minimal space on the windshield to place the antenna such that the clear films or coatings do not adversely affect the functionality of the antenna.

SUMMARY OF THE INVENTION AND ADVANTAGES

The invention provides a window assembly for a vehicle. The window assembly includes an exterior substrate and an interior substrate. The exterior substrate has an inner surface and an outer surface. The interior substrate is disposed adjacent the exterior substrate and has an inner surface and an outer surface. The interior and exterior substrates define a first peripheral boundary. A transparent layer is disposed between the inner surfaces of the exterior and interior substrates. The transparent layer defines an area covering the window assembly with the area defining a second peripheral boundary. The transparent layer includes a metal compound such that the transparent layer is electrically conductive. An outer region which is electrically non-conductive is defined on the window assembly between the first and second peripheral boundaries. An antenna element is disposed within and surrounded by the outer region without extending across the second peripheral boundary into the area of the transparent layer. A feeding element is coupled to the antenna element for energizing the antenna element. The antenna element is electrically disconnected from the transparent layer such that the antenna element operates independent of the transparent layer.

Accordingly, the window assembly provides the outer region for placement of the antenna element within the outer region. As such, the antenna element may be included with the window in instances where there would otherwise be minimal or no space available on the window assembly for the antenna element to function properly without being subjected to interference by the transparent layer. Simultaneously, the area of the transparent layer is maximized for operation of the transparent layer in other useful applications such as a defogging, a defrosting, or an infrared radiation absorbing element.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
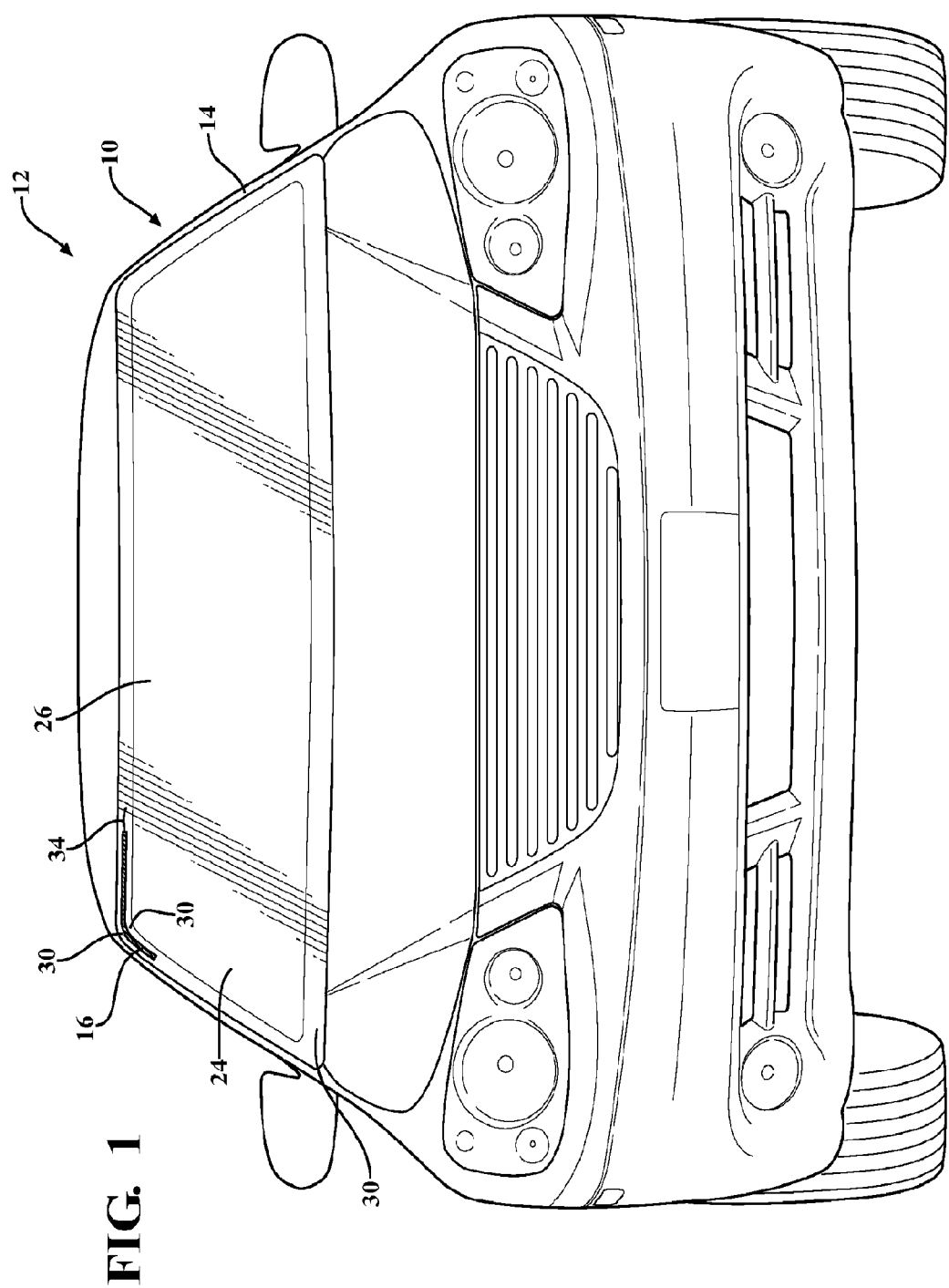
FIG. 1 is a perspective view of a vehicle having a window assembly with a transparent layer defining an area with an outer region adjacent the area and with an antenna element disposed within the outer region.

Referring to the Figures, wherein like numerals indicate corresponding parts throughout the several views, a window assembly is shown generally at 10 in FIG. 1. Most preferably, the window assembly 10 is for a vehicle 12. The window assembly 10 may be a front window (windshield) as illustrated in FIG. 1. Alternatively, the window assembly 10 may be a rear window (backlite), a roof window (sunroof), or any other window of the vehicle 12. Typically, the vehicle 12 defines an aperture and the window assembly 10 closes the aperture. The aperture is conventionally defined by a window frame 14 of the vehicle 12 which is typically electrically conductive. The window assembly 10 of this invention may be for applications other than for vehicles 12. Specifically, the window assembly 10 may be for architectural applications such as homes, buildings, and the like.

An antenna element 16 is included with the window assembly 10. In a preferred embodiment, the antenna element 16 is configured to receive linearly polarized radio frequency (RF) signals. Specifically, the linearly polarized RF signals which the antenna element 16 may receive include, but are not limited to, AM, FM, RKE, DAB, DTV and cell phone signals. The antenna element 16 may also be configured to transmit linearly polarized RF signals. Most preferably, the antenna element 16 is configured for transmission and/or reception of cell phone signals in the frequency range from 800 MHz to 2.1 GHz. Furthermore, the antenna element 16 may be configured to transmit or receive circularly polarized RF signals such as GPS signal, Satellite Digital Audio Radio Service (SDARS) signals, and the like. The antenna element 16 may also be configured to transmit and/or receive both linearly and circularly polarized RF signals independently or concurrently. The window assembly 10 may also include a plurality of antenna elements 16.

Figure 2A:
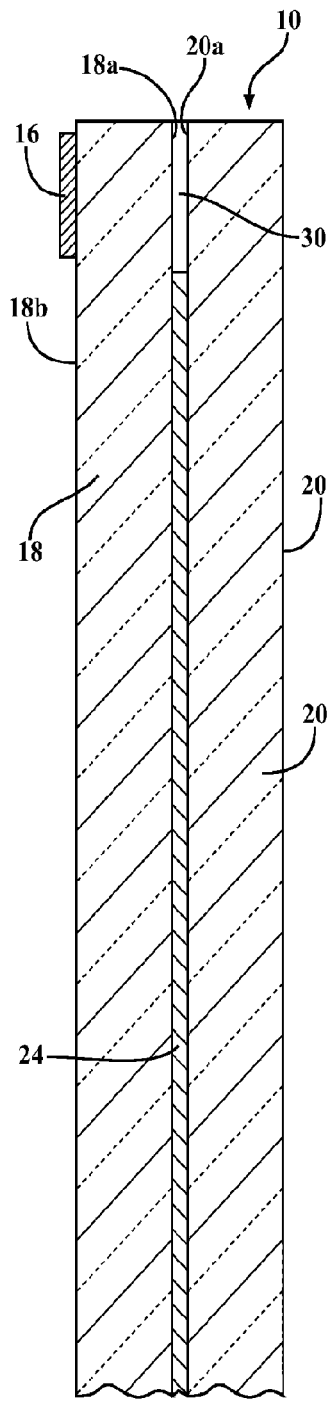
FIG. 2a is a cross-sectional partial view of the window assembly having the transparent layer sandwiched between an interior and exterior substrate and the antenna element disposed within the outer region on an outer surface of the exterior substrate.
Figure 2B:
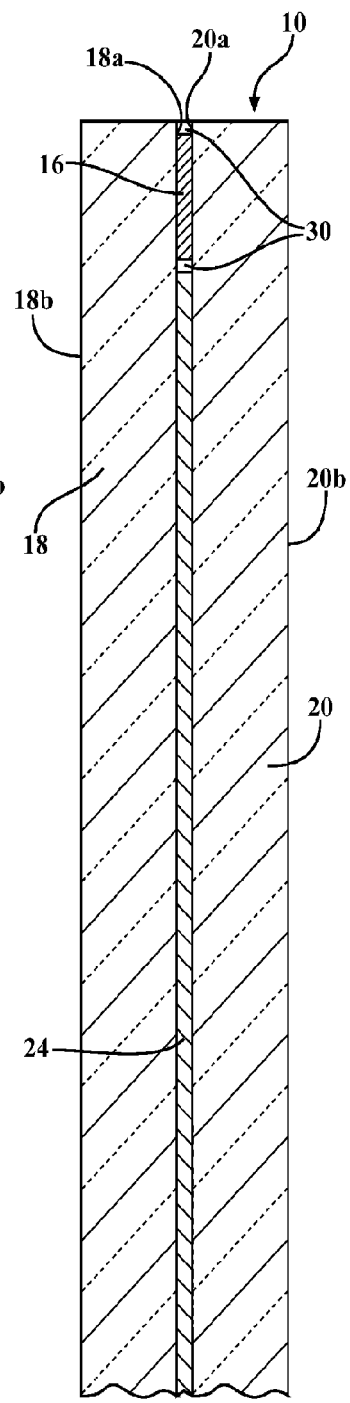
FIG. 2b is a cross-sectional partial view of the window assembly having the transparent layer and the antenna element disposed within the outer region and sandwiched between the interior and exterior substrates.
Figure 2C:
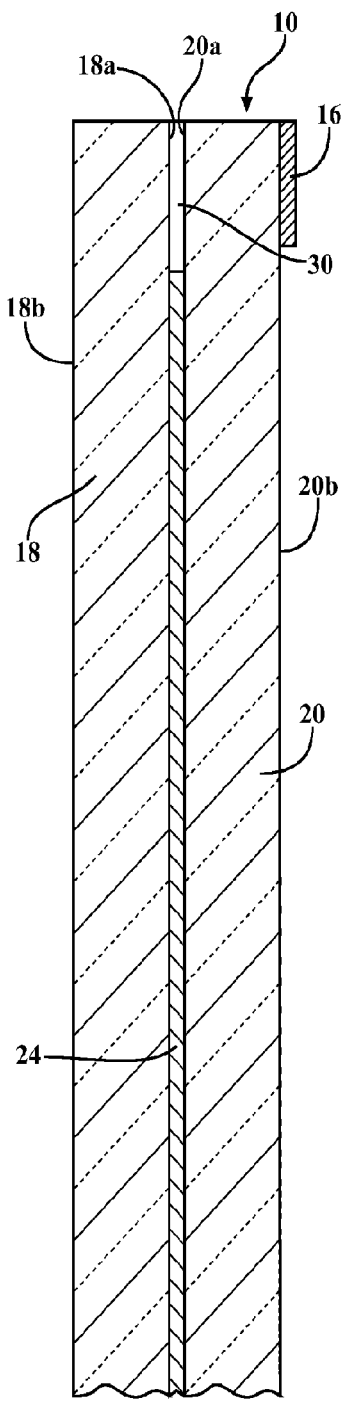
FIG. 2c is a cross-sectional partial view of the window assembly having the transparent layer sandwiched between the interior and exterior substrates and the antenna element disposed within the outer region on an outer surface of the interior substrate.

As illustrated in FIGS. 2a-2c, the window assembly 10 includes an exterior substrate 18 and an interior substrate 20 disposed adjacent the exterior substrate 18. In one embodiment, the interior substrate 20 is disposed parallel to and spaced from the exterior substrate 18 such that the substrates 18, 20 are not contacting one another. However, it is to be appreciated that the exterior substrate 18 may directly abut the interior substrate 20. Typically, the exterior and interior substrates 18, 20 are electrically non-conductive. As mentioned herein, the term "non-conductive" refers generally to a material, such as an insulator or dielectric, that when placed between conductors at different electric potentials, permits a negligible current to flow through the material. The exterior and interior substrates 18, 20 are also substantially transparent to light. However, it is to be appreciated that the exterior and interior substrates 18, 20 may be colored or tinted and still be substantially transparent to light. As used herein, the term "substantially transparent" is defined generally as having a visible light transmittance of greater than 60 percent.

The exterior and interior substrates 18, 20 may be joined together to form the window assembly 10. It is preferred that the exterior and interior substrates 18, 20 are panes of glass. The panes of glass are preferably automotive glass and, more preferably, soda-lime-silica glass. However, the exterior and interior substrates 18, 20 may be plastic, fiberglass, or other suitable electrically non-conductive and substantially transparent material. For automotive applications, the exterior and interior substrates 18, 20 are each typically 3.2 mm thick.

Each of the exterior and interior substrates 18, 20 has an inner surface 18a, 20a and an outer surface 18b, 20b. The outer surface 18b of the exterior substrate 18 typically faces an exterior of the vehicle 12. The outer surface 20b of the interior substrate 20 typically faces an interior of the vehicle 12. The inner surfaces 18a, 20a of the exterior and interior substrates 18, 20 typically face one another when the exterior and interior substrates 18, 20 are joined together to form the window assembly 10.

Figure 3:
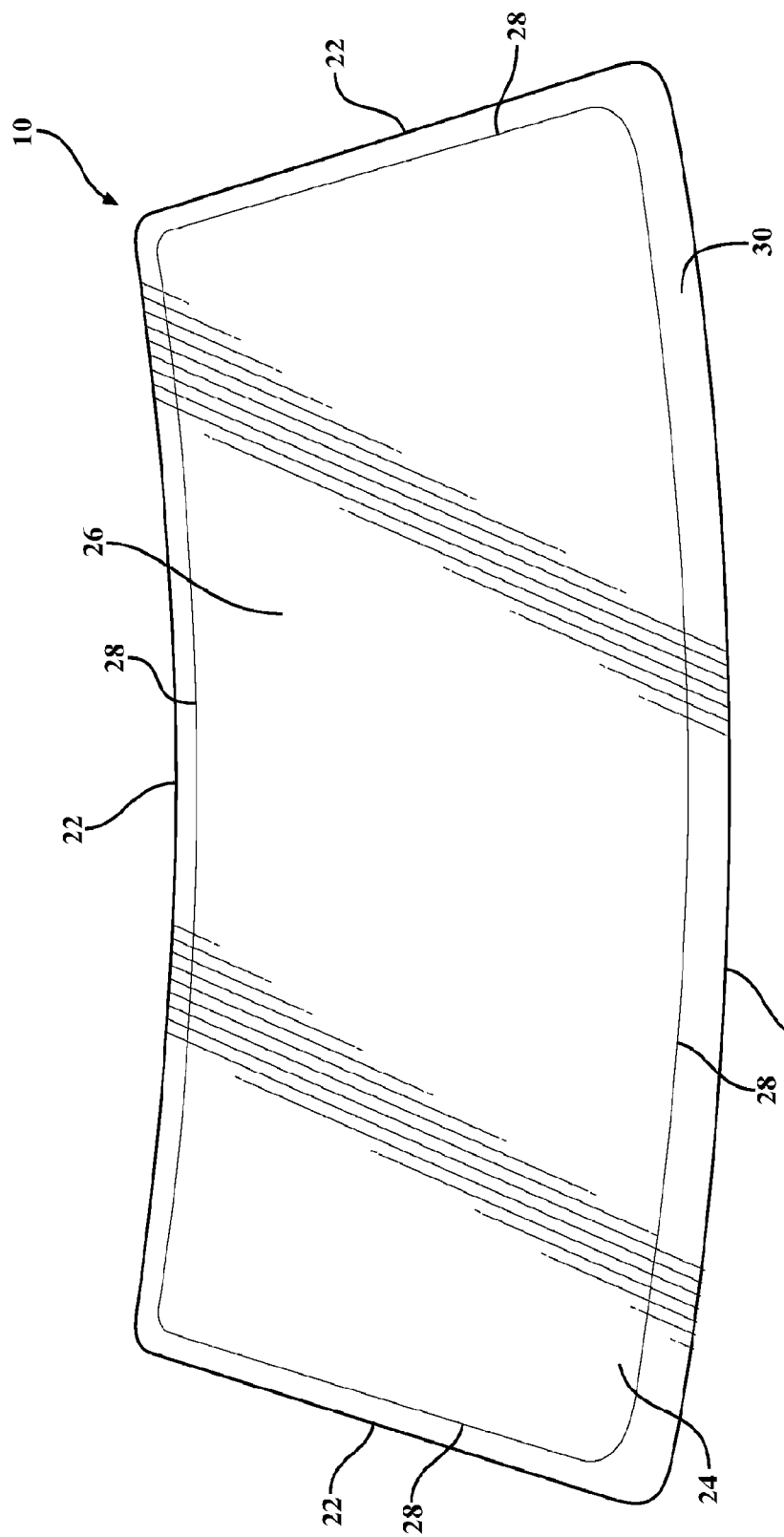
FIG. 3 is a plan view of the window assembly having the outer region adjacent the area of the transparent layer with the transparent layer covering a majority of the window assembly.

As shown in FIG. 3, the exterior and interior substrates 18, 20 define a first peripheral boundary 22. The first peripheral boundary 22 is defined conventionally by a peripheral edge of the window assembly 10. Typically, the peripheral edge of the window assembly 10 is shared by the exterior and interior substrates 18, 20. Specifically, the exterior and interior substrates 18, 20 conventionally have substantially similar areas and shapes with each substrate 18, 20 having an edge forming part of the peripheral edge when the substrates 18, 20 are joined. It is to be appreciated that the edges of exterior and interior substrates 18, 20 need not align to define the first peripheral boundary 22. In other words, the edge of the interior or exterior substrate 18, 20 may extend beyond the edge of the other, respectively. In such instances, the first peripheral boundary 22 may be defined by either or both edges of the substrates 18, 20. Conventionally, the first peripheral boundary 22 has a generally trapezoidal configuration. However, the first peripheral boundary 22 may have any suitable shape.

Referring back to FIGS. 2a-2c, a transparent layer 24 is disposed between the exterior and interior substrates 18, 20. The window assembly 10 preferably includes the transparent layer 24 sandwiched between the exterior and interior substrates 18, 20 such that the transparent layer 24 is abutting the substrates 18, 20. More specifically, the transparent layer 24 is preferably disposed on the inner surfaces 18a, 20a of the interior and/or exterior substrates 18, 20. Disposal of the transparent layer 24 between the exterior and interior substrates 18, 20 protects the transparent layer 24 from direct contact with environmental factors which may damage the transparent layer 24 such as snow, ice, and the like.

The transparent layer 24 is preferably formed from a coating. Typically, the transparent layer 24 is substantially transparent to light. Accordingly, a driver or occupant of the vehicle 12 may see through the window assembly 10 having the transparent layer 24. With the transparent layer 24 disposed within the window assembly 10, the window assembly 10 generally exhibits greater than 60 percent visible light transmission through the window assembly 10. The transparent layer 24 preferably absorbs heat from sunlight penetrating the window assembly 10. In particular, the transparent layer 24 reduces transmission of infrared radiation through the window assembly 10. As used herein, the term "transparent layer" may include one or more coatings and/or films of selected composition. The coatings and/or films forming the transparent layer 24 may be single or multiple layers. The transparent layer 24 may be disposed in the window assembly 10 according to any suitable method, such as chemical vapor deposition, magnetron sputter vapor deposition, spray pyrolysis, and the like.

The transparent layer 24 includes a metal compound such that the transparent layer 24 is electrically conductive. As mentioned herein, the term "electrically conductive" refers generally to a material, such as a conductor, exhibiting low electrical resistivity for effectively allowing flow of electric current through the material. Preferably, the metal compound includes a metal oxide. However, the metal compound may also include a metal nitride, and the like. The metal oxide may include a tin oxide, such as indium tin oxide, or the like. However, the transparent layer 24 may include other metal oxides, including, but not limited to, silver oxide. The metal compound may also be doped with an additive, such as fluorine. Specifically, the additive may be included in the metal compound to optimize the light transmittance, durability, and electrical resistivity of the transparent layer 24. The transparent layer 24 preferably has a sheet resistance in a range between 0.5-20 $\Omega$/square. More preferably, the transparent layer 24 has the sheet resistance of approximately 2 $\Omega$/square. The sheet resistance may also be known as a surface resistance of the transparent layer 24.

The transparent layer 24 defines an area 26 covering the window assembly 10. As shown in FIG. 3, the area 26 may cover a majority of the window assembly 10. Specifically, the majority of the window assembly 10 is defined generally as greater than 50 percent of the window assembly 10. More typically, the majority is greater than 75 percent of the window assembly 10. Preferably, the transparent layer 24 covers the majority of the window assembly 10 for maximizing the reduction of transmission of infrared radiation through the window assembly 10. However, it is to be appreciated that the area 26 of the transparent layer 24 may cover a minority of the window assembly 10. For example, the area 26 may cover 20 percent of the window assembly 10 along the upper portion of the window assembly 10. The area 26 typically defines a shape substantially similar to the first peripheral boundary 22. However, the area 26 may have any suitable shape for covering the window assembly 10. The area 26 of the transparent layer 24 defines a second peripheral boundary 28. The second peripheral boundary 28 is defined conventionally by a boundary or perimeter of the area 26.

An outer region 30 is defined on the window assembly 10 between the first and second peripheral boundaries 22, 28. Typically, the outer region 30 is adjacent to and surrounds the area 26 of the transparent layer 24. However, the outer region 30 may be defined on desired sections of the window assembly 10 such that the outer region 30 is not surrounding the transparent layer 24 continuously along the first peripheral boundary 22. The outer region 30 is devoid of the transparent layer 24 and is therefore, electrically non-conductive. The outer region 30 has a width defined generally as a distance between the first and second peripheral boundaries 22, 28. Preferably, the width is greater than 0 mm and less than 200 mm. The width of the outer region 30 may vary depending upon how the window assembly 10 of the present invention is fitted to the window frame 14 of the vehicle 12. Specifically, the outer region 30 may have the width equal to an overlap between the window frame 14 and the window assembly 10. However, the outer region 30 may separate the transparent layer 24 from the window frame 14 of the vehicle 12 to avoid the possibility of an electrical path between the transparent layer 24 and the window frame 14 which may adversely affect the efficiency and radiation pattern of the antenna element 16. Furthermore, the outer region 30 may protect the transparent layer 24 by separating the transparent layer 24 from the first peripheral boundary 22 which is subjected to environmental factors which may degrade the quality of the transparent layer 24.

The outer region 30 may be formed on the window assembly 10 according to any suitable technique known in the art. For instance, the inner surfaces 18a, 20a of one of the exterior and interior substrates 18, 20 may be masked before application of the transparent layer 24 to provide a desired shape of the outer region 30. Alternatively, the transparent layer 24 may first be applied to the window assembly 10. Thereafter, selected portions of the transparent layer 24 may be removed or deleted to provide the desired shape of the outer region 30. Removal or deletion of selected portions of the transparent layer 24 may be accomplished using lasers, abrasive tools, chemical removal, and the like.

Although not required, an interlayer 32 may be disposed between the inner surfaces 18a, 20a of the exterior and interior substrates 18, 20, as illustrated in FIGS. 4a-4f. In other words, the window assembly 10 may include the exterior and interior substrates 18, 20 having the transparent layer 24 and the interlayer 32 sandwiched therebetween. Preferably, the interlayer 32 bonds the exterior and interior substrates 18, 20 and prevents the window assembly 10 from shattering upon impact. Preferably, the interlayer 32 is substantially transparent to light and typically includes a polymer or thermoplastic resin, such as polyvinyl butyral (PVB). However, other suitable materials for implementing the interlayer 32 may be used. Preferably, the interlayer 32 has a thickness of between 0.5 mm to 1 mm.

Figure 4A:
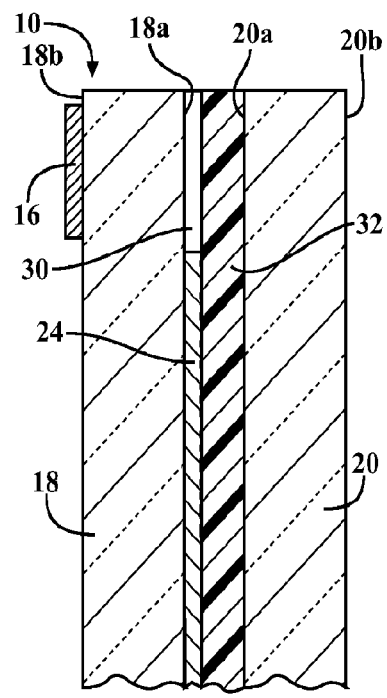
FIG. 4a is a cross-sectional partial view of the window assembly having an interlayer sandwiched between the transparent layer and an inner surface of the interior substrate with the antenna element disposed within the outer region on the outer surface of the exterior substrate.
Figure 4B:
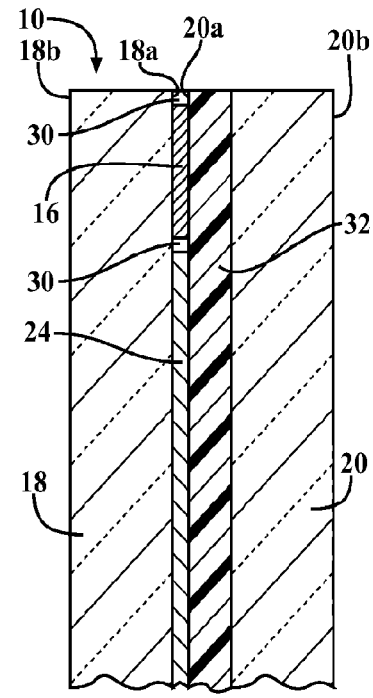
FIG. 4b is a cross-sectional partial view of the window assembly having the interlayer sandwiched between the transparent layer and the inner surface of the interior substrate with the antenna element disposed within the outer region and sandwiched between the interlayer and an inner surface of the exterior substrate.
Figure 4C:
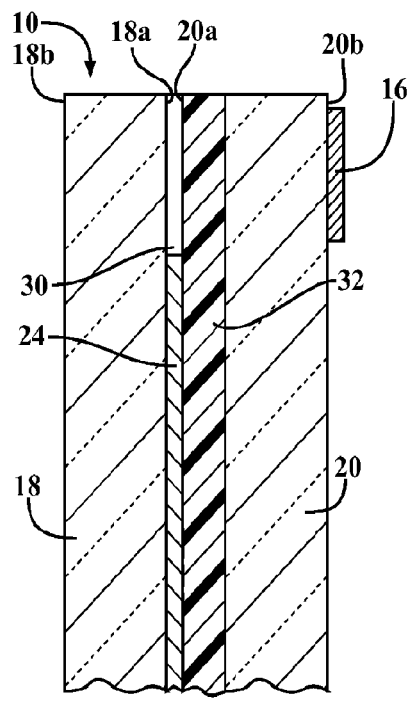
FIG. 4c is a cross-sectional partial view of the window assembly having the interlayer sandwiched between the transparent layer and the inner surface of the interior substrate with the antenna element disposed within the outer region on the outer surface of the interior substrate.

The transparent layer 24 may be disposed adjacent the interlayer 32. More specifically, the transparent layer 24 may be disposed between the interlayer 32 and the inner surface 18a of the exterior substrate 18, as shown in FIGS. 4a-4c. Alternatively, as shown in FIGS. 4d-4h, the transparent layer 24 may be disposed between the interlayer 32 and the inner surface 20a of the interior substrate 20. Preferably, the window assembly 10 includes the transparent layer 24 and interlayer 32 sandwiched between the exterior and interior substrates 18, 20 such that the interlayer 32 and the transparent layer 24 are abutting the inner surfaces 18a, 20a of the exterior and/or interior substrates 18, 20.

Figure 5A:
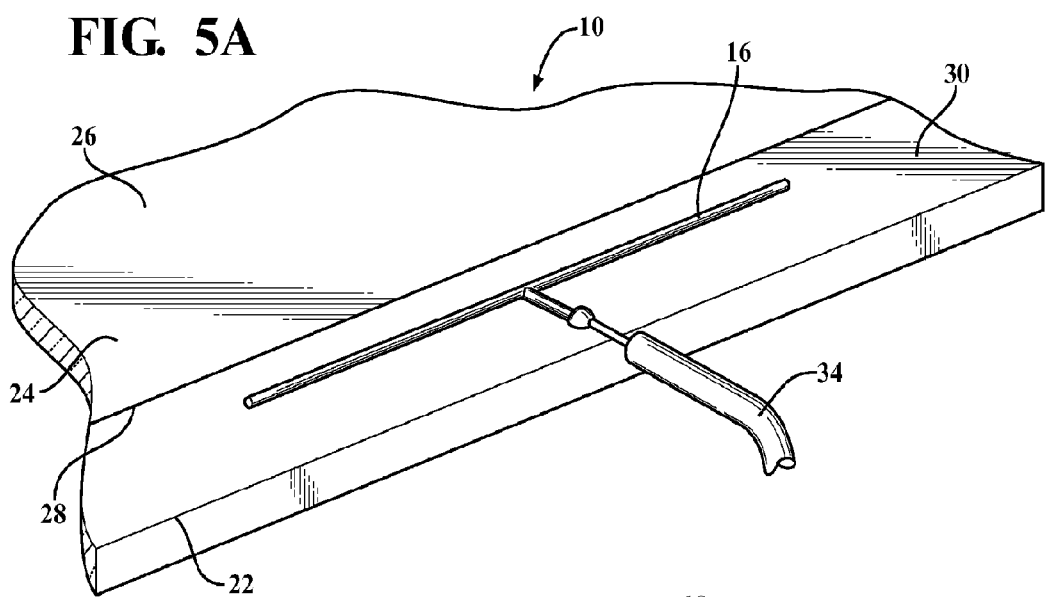
FIG. 5a is an enlarged view of the window assembly having the antenna element including metal wire disposed within the outer region of the transparent layer with a feeding element coupled to the antenna element including metal wire.

The antenna element 16 may include metal wire as shown in FIG. 5a. As used herein, the term "wire" refers generally to at least one strand or rod of metal. Typically, the strands or rods are flexible and are formed of copper or other conductive metals. However, the antenna element 16 may also include an electrically conductive paste, such as a silver paste. The antenna element 16 may be applied to the window assembly 10 according to any suitable method, such as printing, firing, and the like. The antenna element 16 including metal wire may have a predetermined diameter and length correlating to a predetermined wavelength of radio waves intended to be transmitted or received by the antenna element 16. Typically, the antenna element 16 including metal wire is substantially opaque to light such that light cannot pass through the antenna element 16. The antenna element 16 may have any suitable configuration for transmitting and/or receiving RF signals. For instance, the antenna element 16 may have a monopole or dipole configuration of the type shown in FIG. 5a. Furthermore, the antenna element 16 including metal wire may have a loop or meander line configuration. In addition, the antenna element 16 may be included as a subcomponent of a more complex antenna assembly. As mentioned above, the antenna element 16 preferably transmits or receives linearly polarized radio waves. In particular, the antenna element 16 including metal wire is most preferred for transmission or reception of linearly polarized radio waves.

Figure 6A:
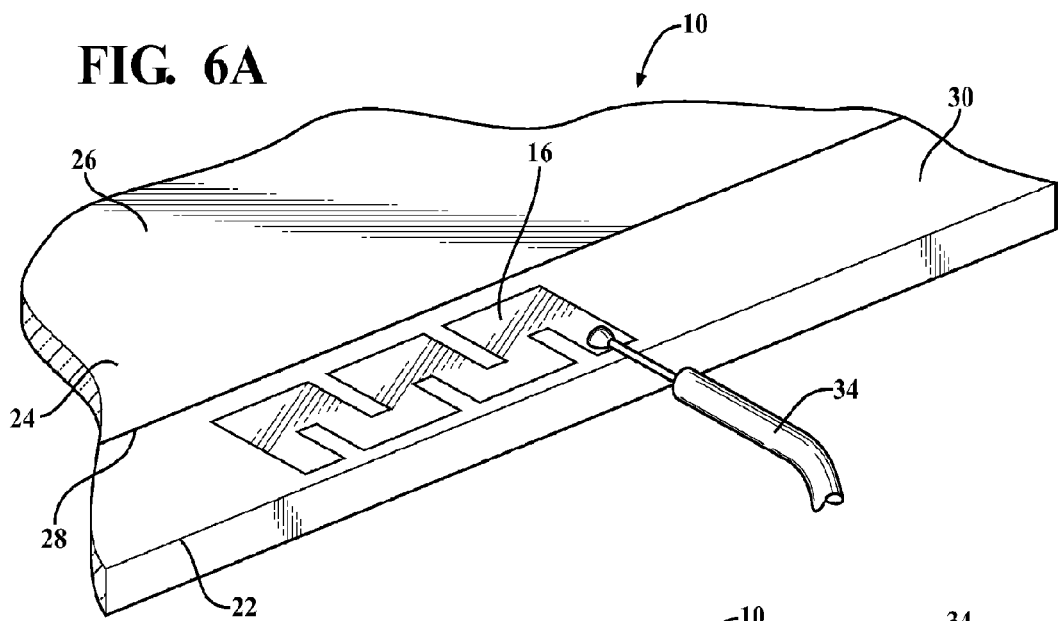
FIG. 6a is an enlarged view of the window assembly having the antenna element including a transparent coating disposed within the outer region of the transparent layer with the feeding element coupled to the antenna element.

As shown in FIG. 6a, the antenna element 16 may also include a transparent coating which is electrically conductive. The transparent coating may be of the same type as the transparent layer 24. The transparent coating may also be a transparent film, or the like. As mentioned above, the antenna element 16 may also transmit or receive circularly polarized radio waves. Particularly, the antenna element 16 including transparent coating is most preferred for transmission or reception of circularly polarized radio waves. In addition, the antenna element 16 may include a combination of metal wire and transparent coating. The antenna element 16 may have a monopole or dipole configuration as well as other configurations such as a patch or a slot antenna configuration. It is also to be appreciated that the specific configurations of the antenna elements 16 throughout the Figures are for illustrative purposes and are not intended to limit the scope of the present invention to the specific embodiments illustrated therein. As such, the antenna element 16 may be of any other suitable configuration not shown throughout the Figures.

Figure 4D:
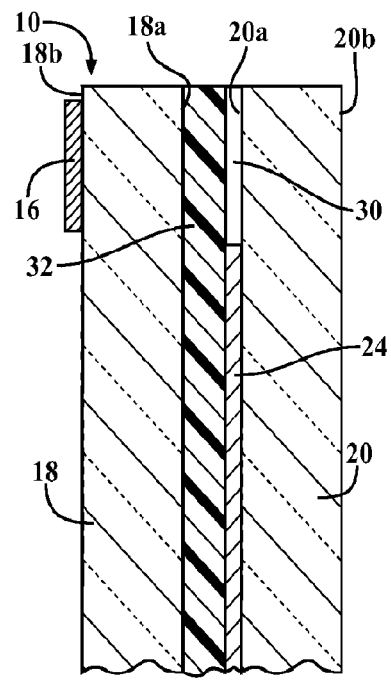
FIG. 4d is a cross-sectional partial view of the window assembly having the interlayer sandwiched between the transparent layer and the inner surface of the exterior substrate with the antenna element disposed within the outer region on the outer surface of the exterior substrate.
Figure 4E:
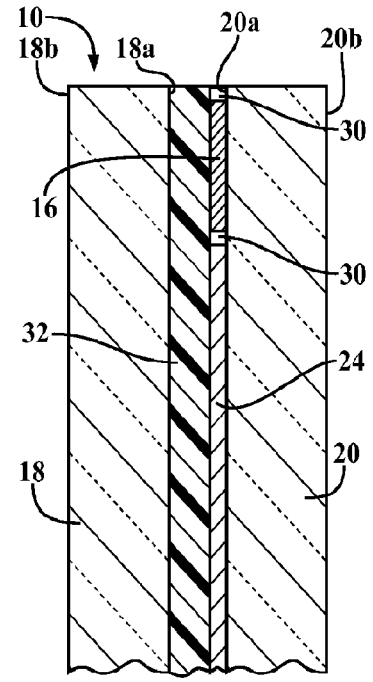
FIG. 4e is a cross-sectional partial view of the window assembly having the interlayer sandwiched between the transparent layer and the inner surface of the exterior substrate with the antenna element disposed within the outer region and sandwiched between the interlayer and an inner surface of the interior substrate.

The antenna element 16 is disposed within and surrounded by the outer region 30 without extending across the second peripheral boundary 28 into the area 26 of the transparent layer 24. In other words, the outer region 30 separates the antenna element 16 from the transparent layer 24 such that the antenna element 16 neither abuts nor overlaps the transparent layer 24. As illustrated in FIGS. 2b, 4b, and 4e, the antenna element 16 may be disposed coplanar with respect to the transparent layer 24. In other words, the antenna element 16 may be disposed within and surrounded by the outer region 30 yet be on the same layer in the window assembly 10 as the transparent layer 24. Alternatively, as shown in FIGS. 2a, 2c, 4a, 4c, 4d, and 4f, the antenna element 16 may be disposed non-coplanar with respect to the transparent layer 24. In such instances, the antenna element 16 is disposed within the outer region 30 but on a different layer in the window assembly 10 than the transparent layer 24.

Figure 4F:
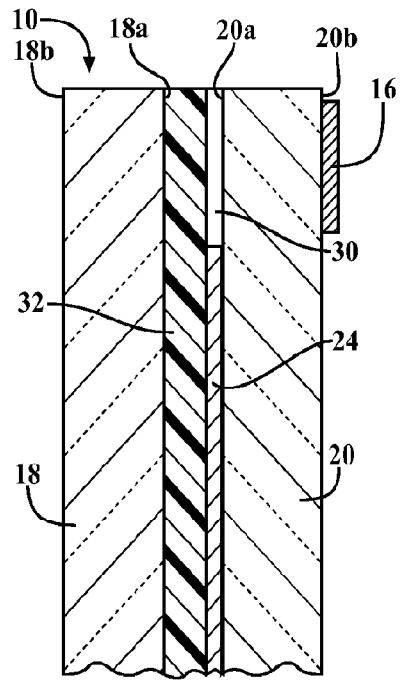
FIG. 4f is a cross-sectional partial view of the window assembly having the interlayer sandwiched between the transparent layer and the inner surface of the exterior substrate with the antenna element disposed within the outer region on the outer surface of the interior substrate.
Figure 4G:
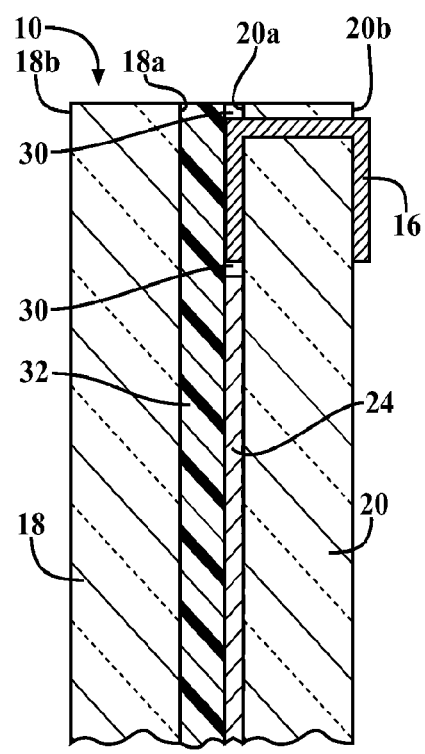
FIG. 4g is a cross-sectional partial view of the window assembly having one portion of the antenna element disposed coplanar with respect to the transparent layer and another portion of the antenna element disposed non-coplanar with respect to the transparent layer and on the outer surface of the interior substrate.
Figure 4H:
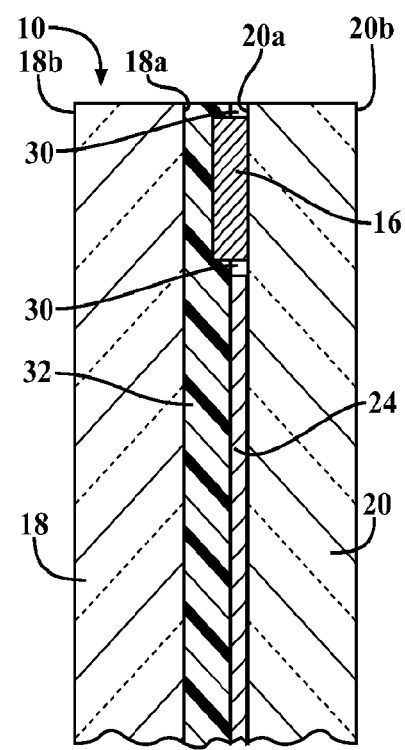
FIG. 4h is a cross-sectional partial view of the window assembly having the one portion of the antenna element disposed coplanar with respect to the transparent layer and the other portion disposed non-coplanar with respect to the transparent layer and extending into the interlayer.

Still, the antenna element 16 may simultaneously be disposed coplanar and non-coplanar with respect to the transparent layer 24. Specifically, one portion of the antenna element 16 may be disposed on the same layer in the window assembly 10 as the transparent layer 24, while another portion of the antenna element 16 is disposed on another layer in the window assembly 10. For instance, FIG. 4g shows the one portion of the antenna element 16 disposed coplanar with respect to the transparent layer 24 and the other portion of the antenna element 16 disposed on the outer surface 20b of the interior substrate 20. In another embodiment shown in FIG. 4h, the one portion of the antenna element 16 is disposed coplanar with respect to the transparent layer 24 while the other portion is extending into the interlayer 32. Alternatively, the antenna element 16 may extend into one of the exterior and interior substrates 18, 20. It is to be appreciated that the antenna element 16 may be disposed non-coplanar with respect to the transparent layer 24 and still be disposed within the outer region 30.

The outer region 30 may have any suitable dimensions, configuration, or shape for accommodating the antenna element 16. For instance, the outer region 30 may have a rectangular configuration, a curved configuration, or the like. More specifically, the first and second peripheral boundaries 22, 28 defining the outer region 30 may follow a substantially linear path, curved path, or the like. The outer region 30 may be sized such that the antenna element 16 substantially occupies the outer region 30. In other words, the outer region 30 may be sized to the extent necessary to effectively accommodate the antenna element 16. As such, the area 26 of the transparent layer 24 is maximized for its other functions, such as absorbing infrared radiation penetrating the window assembly 10. Alternatively, the antenna element 16 may occupy only a minority of the outer region 30.

While disposed within the outer region 30, the antenna element 16 may be arranged according to several configurations with respect to the transparent layer 24, interlayer 32, and substrates 18, 20 of the window assembly 10. In instances where the window assembly 10 is absent the interlayer 32, the antenna element 16 may be disposed within the outer region 30 between the exterior and interior substrates 18, 20 of the window assembly 10 as shown in one embodiment in FIG. 2b. In the embodiment of FIG. 2b, the antenna element 16 is coplanar with respect to the transparent layer 24. According to another embodiment, as shown in FIG. 2a, the antenna element 16 may be disposed within the outer region 30 on the outer surface 18b of the exterior substrate 18 of the window assembly 10. In another, as shown in FIG. 2c, the antenna element 16 may be disposed within the outer region 30 on the outer surface 20b of the interior substrate 20 of the window assembly 10. In FIGS. 2a and 2c, the antenna element 16 is non-coplanar with respect to the transparent layer 24.

Where the window assembly 10 has the interlayer 32 disposed between the transparent layer 24 and the inner surface 20a of the interior substrate 20, FIG. 4b shows the antenna element 16 disposed within the outer region 30 between the interlayer 32 and the inner surface 18a of the exterior substrate 18, according to one embodiment. In another embodiment, as shown in FIG. 4c, the antenna element 16 is disposed within the outer region 30 on the outer surface 20b of the interior substrate 20. Alternatively, as shown in FIG. 4a, the antenna element 16 may also be disposed within the outer region 30 on the outer surface 18b of the exterior substrate 18. The antenna element 16 is coplanar with respect to the transparent layer 24 in FIG. 4b, and non-coplanar with respect to the transparent layer 24 in FIGS. 4a and 4c.

Where the window assembly 10 has the interlayer 32 disposed between the transparent layer 24 and the inner surface 18a of the exterior substrate 18, FIG. 4e shows the antenna element 16 disposed within the outer region 30 between the interlayer 32 and the inner surface 20a of the interior substrate 20, according to another embodiment. In another embodiment, as shown in FIG. 4d, the antenna element 16 is disposed within the outer region 30 on the outer surface 18b of the exterior substrate 18. The antenna element 16 may also be disposed within the outer region 30 on the outer surface 20b of the interior substrate 20, as shown in FIG. 4f. The antenna element 16 is coplanar with respect to the transparent layer 24 in the FIG. 4e, and non-coplanar with respect to the transparent layer 24 in FIGS. 4d and 4f. Although not specifically illustrated throughout the Figures, it is to be appreciated that the antenna element 16 may additionally be disposed on a side of the interlayer 32 opposite the side of the interlayer 32 disposed adjacent the transparent layer 24. Additionally, it is to be appreciated that the antenna element 16 and/or the transparent layer 24 may be embedded within the interlayer 32 such that the antenna element 16 and/or the transparent layer 24 are sandwiched between the interlayer 32.

Figure 7:
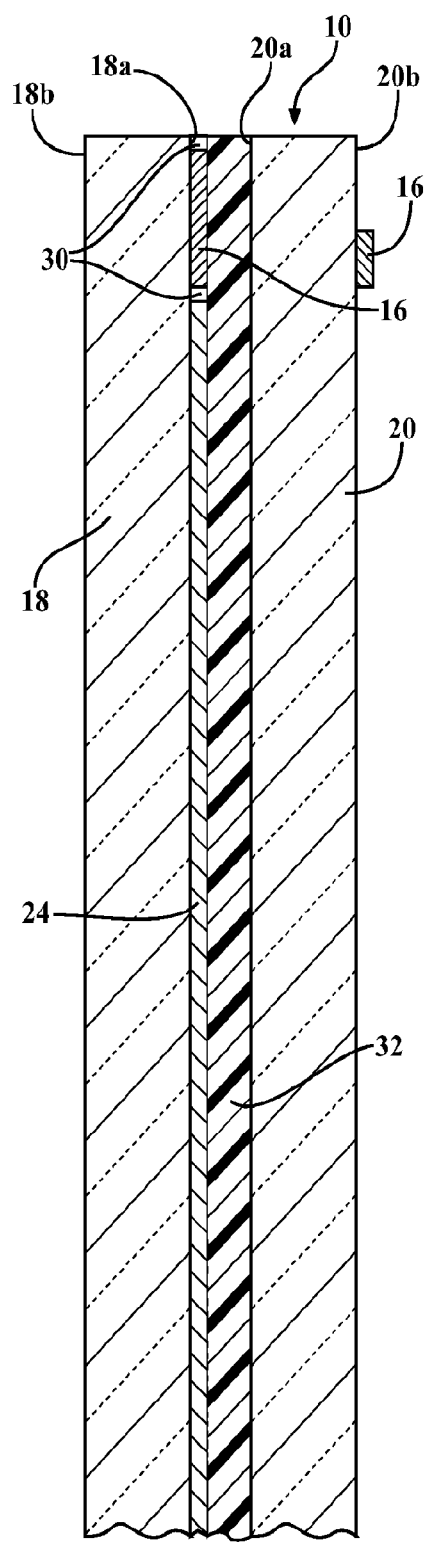
FIG. 7 is a cross-sectional partial view of the window assembly having a first antenna element disposed within the outer region and sandwiched between the interlayer and the inner surface of the exterior substrate and a second antenna element disposed on the outer surface of the interior substrate.

Still, according to another embodiment as shown in FIG. 7, the window assembly 10 includes a second antenna element 16 wherein one of the antenna elements 16 is disposed on the outer surface 20b of the interior substrate 20 and the other of the antenna elements 16 is disposed on the inner surface 18a of the exterior substrate 18. Preferably, at least one of the antenna elements 16 is disposed within the outer region 30. However, both antenna elements 16 may be disposed within the outer region 30 on different layers of the window assembly 10. It is to be appreciated that the first and second antenna elements 16 may implement a diversity antenna system whereby the first and second antenna elements 16 may be configured to transmit or receive signals in multiple directions within a field of reception. Specifically, the received signal may be switched or combined between the first and second antenna elements 16 to minimize interference and temporary fading of the signal. It is to be appreciated that the antenna elements 16 may be disposed according to numerous embodiments with respect to the substrates 18, 20, the transparent layer 24, and the interlayer 32, not specifically shown in the Figures.

As shown generally in FIGS. 5 and 6, the window assembly 10 includes a feeding element 34 coupled to the antenna element 16 for energizing the antenna element 16. With respect to the feeding element 34, the term "energize" is understood to describe an electrical relationship between the feeding element 34 and the antenna element 16 whereby the feeding element 34 excites the antenna element 16 for transmission of radio waves, and is electrically coupled to the antenna element 16 for reception of impinging radio waves by the antenna element 16. The feeding element 34 may include any suitable material for energizing the antenna element 16. For instance, the feeding element 34 may include a feeding strip, a feeding wire, or a combination of both. Also, the feeding element 34 may be a balanced or unbalanced line. For example, the feeding element 34 may be an unbalanced coaxial cable, microstrip, or single wire line. Furthermore, the feeding element 34 may include any suitable feeding network for providing phase shifting to the RF signal transmitted or received by the antenna element 16. In addition, the feeding element 34 may include a transparent coating of the same type as the transparent layer 24 and/or the antenna element 16. Additionally, a plurality of feeding elements 34 may be coupled to one or more antenna elements 16 for energizing the antenna elements 16. The feeding element 34 is preferably disposed on the inner surfaces 18a, 20a or outer surfaces 18b, 20b of one of the exterior and interior substrates 18, 20 of the window assembly 10. However, it is to be appreciated that the feeding element 34 may be disposed on any layer of the window assembly 10. Furthermore, the feeding element 34 may be disposed coplanar or non-coplanar with respect to the antenna element 16.

Figure 5B:
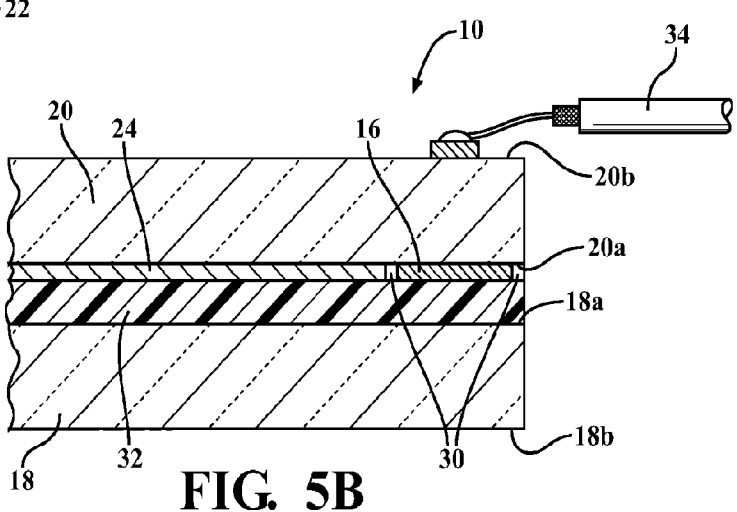
FIG. 5b is a partial cross-sectional view of the window assembly having the feeding element spaced from and capacitively coupled to the antenna element including metal wire.
Figure 5C:
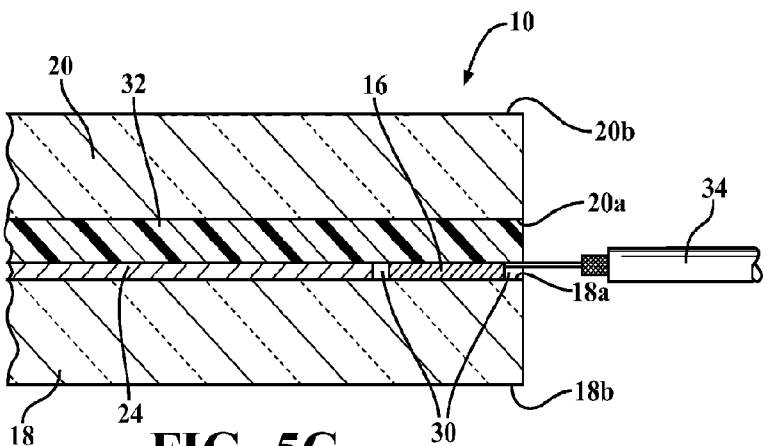
FIG. 5c is a partial cross-sectional view of the window assembly having the feeding element abutting and in direct electrical connection with the antenna element including metal wire.
Figure 6B:
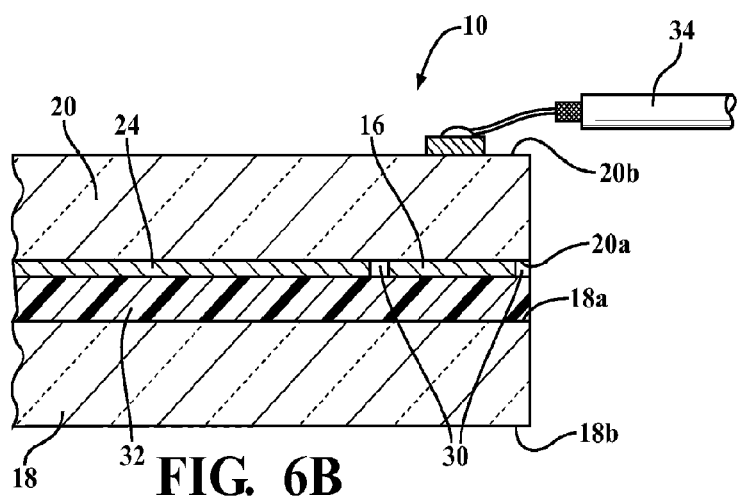
FIG. 6b is a partial cross-sectional view of the window assembly having the feeding element spaced from and capacitively coupled to the antenna element including the transparent coating.
Figure 6C:
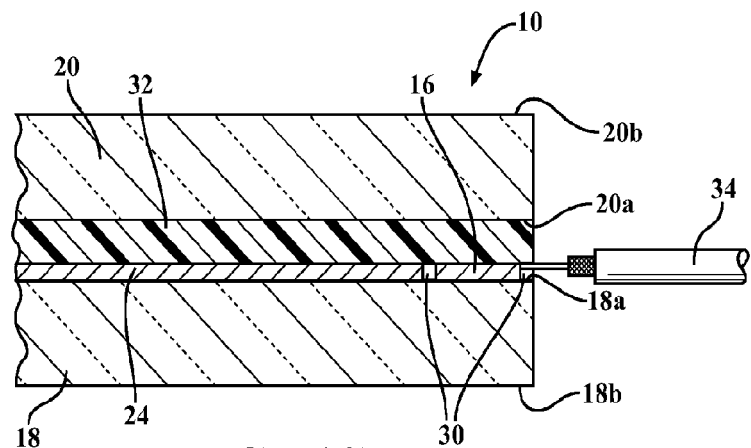
FIG. 6c is a partial cross-sectional view of the window assembly having the feeding element abutting and in direct electrical connection with the antenna element including transparent coating.

According to one embodiment, as shown in FIGS. 5c and 6c, the feeding element 34 is abutting and in direct electrical connection with the antenna element 16 for energizing the antenna element 16. In other words, the feeding element 34 is directly wired or soldered to the antenna element 16. The feeding element 34 passes electrical current to the antenna element 16 directly through an electrically conductive material, such as a feeding strip or wire, physically attached to the antenna element 16. It is to be appreciated that the feeding element 34 and the antenna element 16 may be abutting and in direct electrical connection on the window assembly 10 according to several other configurations with respect to the transparent layer 24 and the interlayer 32 not specifically illustrated throughout the Figures.

Alternatively, as shown in FIGS. 5b and 6b, the feeding element 34 may be spaced from and capacitively coupled to the antenna element 16 for energizing the antenna element 16. In particular, the feeding element 34 induces current to the antenna element 16 through the air or a dielectric material, such as the interior or exterior substrate 18. In such embodiments, the feeding element 34 is neither hard-wired nor in direct contact with the antenna element 16 and is typically disposed non-coplanar with the antenna element 16. It is to be appreciated that the feeding element 34 may be spaced from and capacitively coupled to the antenna element 16 on the window assembly 10 according to several other embodiments with respect to the transparent layer 24 and the interlayer 32 which are not specifically illustrated throughout the Figures.

In one embodiment, the feeding element 34 overlaps the outer region 30. Specifically, the feeding element 34 may be disposed entirely within the outer region 30 for energizing the antenna element 16. Alternatively, the feeding element 34 may be partially overlapping the outer region 30. In such instances, the feeding element 34 may overlap the transparent layer 24. However, such overlap is merely incidental to positioning of the feeding element 34 on the window assembly 10 and the feeding element 34 is generally not operatively coupled to the transparent layer 24, as will be described below.

According to the present invention, the antenna element 16 is electrically disconnected from the transparent layer 24 such that the antenna element 16 operates independent of the transparent layer 24. As mentioned above, the antenna element 16 is disposed within the outer region 30 such that the antenna element 16 is neither directly abutting nor in direct electrical contact with the transparent layer 24. As such, the antenna element 16 is neither wired nor soldered to the transparent layer 24. In addition, the antenna element 16 may transmit and/or receive radio waves independent of the transparent layer 24. Said differently, the transparent layer 24 is not an active antenna element operatively coupled to the antenna element 16. Radio waves transmitted or received by the antenna element 16 pass through the outer region 30 and generally are not operatively channeled through the transparent layer 24.

Furthermore, the antenna element 16 may also be capacitively decoupled from the transparent layer 24. In other words, the antenna element 16 may be decoupled from the transparent layer 24 such that the transparent layer 24 does not function as an active antenna element. It is to be appreciated that the transparent layer 24 may be parasitically coupled to the antenna element 16 as the antenna element 16 is energized. However, such parasitic coupling may merely be incidental and it is to be appreciated that the antenna element 16 still operates independent of the transparent layer 24.

Accordingly, the outer region 30 enables uninterrupted transmission and/or reception of radio waves by the antenna element 16 as the antenna element 16 is energized on the window assembly 10. Simultaneously, the antenna element 16 operates free of the transparent layer 24 as intended by the present invention. Furthermore, the area 26 of the transparent layer 24 is maximized and the transparent layer 24 may still function for other purposes, such as a defrosting or a defogging element, an infrared radiation absorbing material, and the like. Additionally, disposal of the antenna element 16 in the outer region 30 provides an unobstructed field of view for the driver of the vehicle 12.

The feeding element 34 may also be electrically disconnected from the transparent layer 24 such that the feeding element 34 energizes the antenna element 16 independent of the transparent layer 24. As mentioned above, the feeding element 34 is coupled to the antenna element 16 for energizing the antenna element 16. Preferably, the feeding element 34 is not directly wired to the transparent layer 24. Instead, it is preferred that the feeding element 34 is electrically connected to the antenna element 16 independent of the transparent layer 24. Additionally, the feeding element 34 is preferably capacitively decoupled from the transparent layer 24. As such, the feeding element 34 preferably does not energize the transparent layer 24 as an active antenna element. However, it is to be appreciated that the feeding element 34 may incidentally or parasitically be capacitively coupled to the transparent layer 24. Also, it is to be appreciated that the feeding element 34 may be electrically connected to other components such as the vehicle 12 body, and the like.

The present invention has been described herein in an illustrative manner. It is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A window assembly for a vehicle, said window assembly comprising:
    an exterior substrate having an inner surface and an outer surface;
    an interior substrate disposed adjacent said exterior substrate and having an inner surface and an outer surface with said interior and exterior substrates defining a first peripheral boundary;
    a transparent layer disposed between said inner surfaces of said exterior and interior substrates and defining an area covering said window assembly with said area defining a second peripheral boundary, wherein said transparent layer comprises a metal compound such that said transparent layer is electrically conductive;
    an outer region defined on said window assembly between said first and second peripheral boundaries and being electrically non-conductive;
    an antenna element being disposed within and surrounded by said outer region without extending across said second peripheral boundary into said area of said transparent layer; and
    a feeding element coupled to said antenna element for energizing said antenna element;
    wherein said antenna element is electrically disconnected from said transparent layer such that said antenna element is neither directly abutting nor in direct electrical contact with said transparent layer and such that said transparent layer is configured to parasitically couple to said antenna element.

2. A window assembly as set forth in claim 1 wherein said feeding element is electrically disconnected from said transparent layer such that said feeding element is neither directly abutting nor in direct electrical contact with said transparent layer.

3. A window assembly as set forth in claim 1 wherein said antenna element comprises metal wire.

4. A window assembly as set forth in claim 1 wherein said antenna element comprises a transparent coating which is electrically conductive.

5. A window assembly as set forth in claim 1 wherein said antenna element is disposed non-coplanar with said transparent layer.

6. A window assembly as set forth in claim 1 wherein said antenna element is disposed coplanar with said transparent layer.

7. A window assembly as set forth in claim 1 wherein said feeding element is spaced from and capacitively coupled to said antenna element.

8. A window assembly as set forth in claim 1 wherein said feeding element overlaps said outer region.

9. A window assembly as set forth in claim 1 including an interlayer disposed between said inner surfaces of said exterior and interior substrates.

10. A window assembly as set forth in claim 9 wherein said transparent layer is disposed between said interlayer and said inner surface of said exterior substrate.

11. A window assembly as set in claim 9 wherein said transparent layer is disposed between said interlayer and said inner surface of said interior substrate.

12. A window assembly as set forth in claim 9 wherein said antenna element is disposed between said interlayer and said inner surface of said exterior substrate.

13. A window assembly as set forth in claim 9 wherein said antenna element is disposed between said interlayer and said inner surface of said interior substrate.

14. A window assembly as set forth in claim 1 wherein said antenna element is actively energized and wherein said transparent layer is parasitically energized.

15. A window assembly as set forth in claim 1 wherein said transparent layer is configured to parasitically modify impedance characteristics of said antenna element.

16. A window assembly as set forth in claim 1 wherein said antenna element is sandwiched between said exterior and interior substrates.

17. A window assembly as set forth in claim 1 wherein said outer region completely surrounds said area of said transparent layer along said second peripheral boundary such that said outer region separates said transparent layer from a window frame of the vehicle and such that said transparent layer is not actively coupled to the window frame.

18. A window assembly as set forth in claim 1 wherein said antenna element is electrically disconnected from said transparent layer such that said antenna element is neither wired nor soldered to said transparent layer.

19. A window assembly as set forth in claim 1 wherein said transparent layer is not an active antenna element operatively coupled to said antenna element.

20. A window assembly as set forth in claim 1 wherein said transparent layer is at least one of a defrosting or a defogging element and an infrared radiation absorbing element.

* * * * *